US010375014B2

(12) United States Patent
Singh et al.

(10) Patent No.: US 10,375,014 B2
(45) Date of Patent: Aug. 6, 2019

(54) SYSTEM AND METHOD FOR MINIMIZING BROADCAST COMMUNICATIONS WHEN ALLOCATING NETWORK ADDRESSES

(71) Applicant: Dell Products, LP, Round Rock, TX (US)

(72) Inventors: Ankit Singh, Bangalore (IN); Rohit Kumar Arehalli, Bangalore (IN); Shekar Babu Suryananarayana, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 246 days.

(21) Appl. No.: 14/963,926

(22) Filed: Dec. 9, 2015

(65) Prior Publication Data

US 2017/0171148 A1 Jun. 15, 2017

(51) Int. Cl.
*H04L 29/12* (2006.01)
*H04W 4/02* (2018.01)
*H04W 4/06* (2009.01)

(52) U.S. Cl.
CPC ......... *H04L 61/2007* (2013.01); *H04W 4/025* (2013.01); *H04W 4/06* (2013.01)

(58) Field of Classification Search
None
See application file for complete search history.

(56) References Cited

U.S. PATENT DOCUMENTS

| | | | | |
|---|---|---|---|---|
| 7,903,174 | B2 | 3/2011 | Ishida et al. | |
| 2004/0078592 | A1 * | 4/2004 | Fagone | H04L 63/0272 726/22 |
| 2005/0027778 | A1 * | 2/2005 | Dimitrelis | H04L 29/1232 709/200 |
| 2005/0080901 | A1 * | 4/2005 | Reader | H04L 63/104 709/226 |
| 2010/0098082 | A1 * | 4/2010 | Sampath | H04L 45/00 370/392 |
| 2010/0135297 | A1 | 6/2010 | Brousard et al. | |
| 2010/0332664 | A1 * | 12/2010 | Yevmenkin | H04L 29/12405 709/227 |
| 2014/0341080 | A1 | 11/2014 | Lin et al. | |
| 2015/0163656 | A1 * | 6/2015 | Son | H04W 8/26 370/338 |

(Continued)

OTHER PUBLICATIONS

Piscitello, David M., "What Broadcast Traffic Reveals," WatchGuard Technologies, Inc., 2003, pp. 1-4, http://www.corecom.com/external/livesecurity/broadcasttraffic.htm.

(Continued)

*Primary Examiner* — Xavier Szewai Wong
(74) *Attorney, Agent, or Firm* — Larson Newman, LLP

(57) ABSTRACT

A network device may be configured to cause one or more network address allocation communications broadcast in a network to be communicated as directed unicast communications. More particularly, in a Local Area Network, a routing device such as a switch may be modified to receive broadcast communications for network address allocation, and instead of propagating the broadcast communications as broadcast communications, the routing device may route the network address allocation communications as directed unicast communications in the Local Area Network.

20 Claims, 11 Drawing Sheets

(56) References Cited

U.S. PATENT DOCUMENTS

| | | | | |
|---|---|---|---|---|
| 2016/0135016 A1* | 5/2016 | Zou | H04W 4/06 370/312 |
| 2016/0308774 A1* | 10/2016 | Astigarraga | H04L 47/25 |

OTHER PUBLICATIONS

"DHCP Relay Agent Information Option," M. Patrick, Motorola BCS Network Working Group, Request for Comments: 3046, Jan. 2001, pp. 1-14, https://tools.ieff.org/html/rfc3046.

* cited by examiner

SYSTEM AND METHOD FOR MINIMIZING BROADCAST COMMUNICATIONS WHEN ALLOCATING NETWORK ADDRESSES

FIELD OF THE DISCLOSURE

The present disclosure generally relates to information handling systems, and more particularly relates to minimizing broadcast communications over a network when allocating addresses in the network.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. Information handling systems can include a variety of hardware and software resources that can be configured to process, store, and communicate information and can include one or more computer systems, data storage systems, networking systems, and mobile communication systems. Information handling systems can also implement various virtualized architectures. Data and voice communications among information handling systems may be via networks that are wired, wireless, or some combination.

Information handling systems can include devices such as switches and servers for routing in a network. One or more servers in a network may allocate network address to other information handling systems such as end-user computer devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
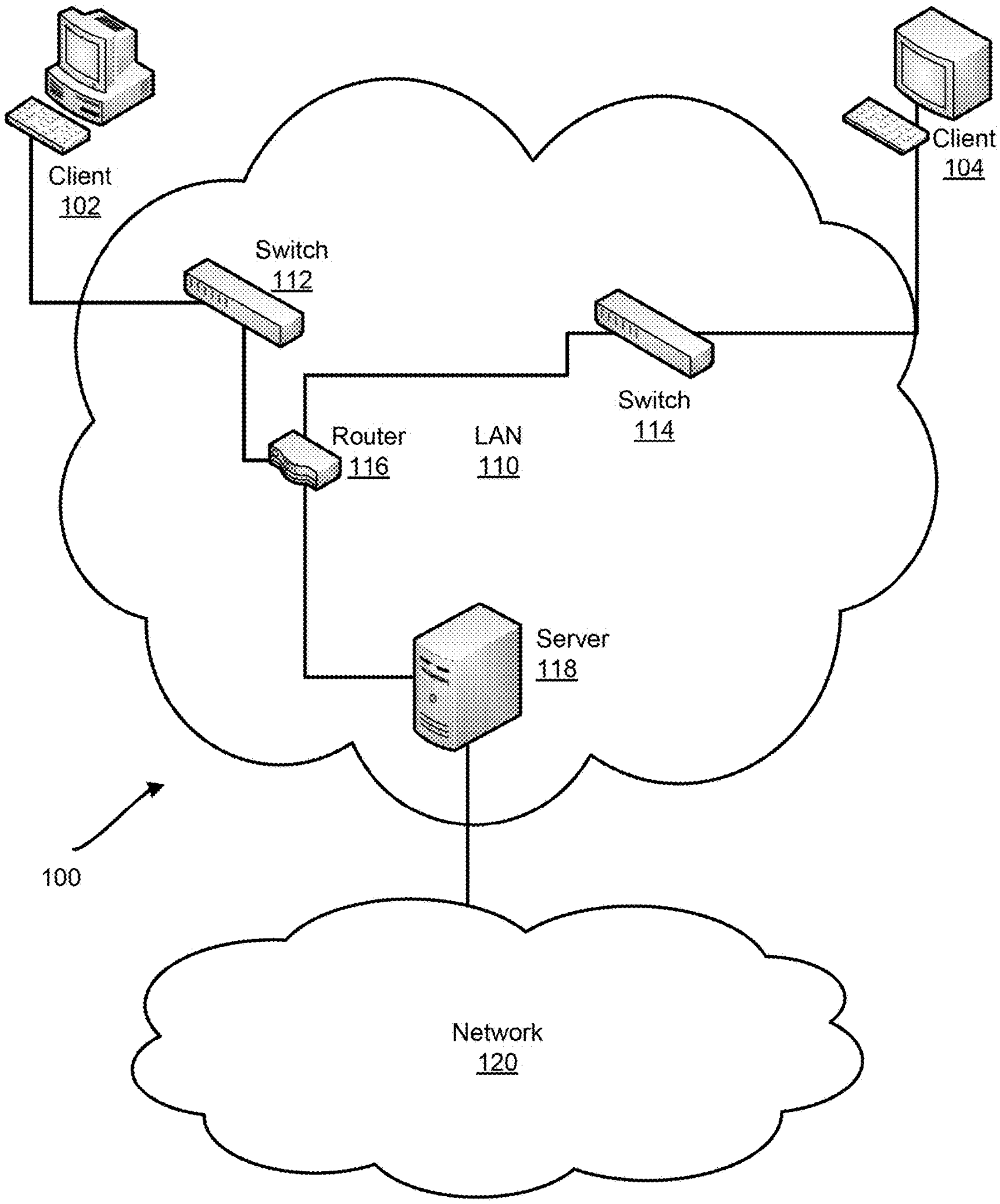
FIG. 1 is a schematic view of a network.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In a local area network (LAN), network protocols enable servers to assign network addresses to client devices such as end-user computers coupled to the LAN so that client devices may communicate over the LAN. A LAN may span a building or organization, and may in turn be coupled to the broader internet or other network. For example, a hospital may have a LAN for the computers in the hospital and the LAN may be hosted by one or more servers or other network devices. The hospital LAN may in turn be connected to the world wide web via a connection between the LAN and the world wide web.

One or more servers hosting a LAN may assign addresses to client devices connecting to the LAN, to allow for routing data to and from the client devices. Network protocols govern assigning addresses to client devices. For example, the Dynamic Host Configuration Protocol (DHCP) is one example of a protocol governing assigning Internet Protocol (IP) addresses within a LAN to client devices, so that the client devices may communicate with and over the LAN.

Generally, when a client device connects to a LAN, the client device requests an IP (LAN network) address by sending an IP address request to the LAN which is broadcast throughout the LAN. The broadcast IP address request is received by a server hosting the LAN. In turn, the server broadcasts over the LAN to the client device, and this broadcast communication between server and client over the LAN continues until a LAN network address is assigned to the client device and confirmed. Broadcast communications between server and client to allocate addresses to clients is cumbersome, clogs LAN bandwidth, and allows for security breaches because the server may easily be spoofed, and address data is continually passed through the LAN.

LANs often have one or more network switches and these switches are often located in a LAN between servers and clients. A switch may have a set of ports for routing, and individual ports may be connected to servers or client devices. To minimize broadcast communications between client devices and servers to allocate LAN addresses to client devices, a network switch may monitor broadcast communications between client devices and servers and log server details and client details, such as the switch port the server is connected to or the switch port the client device is coupled to. Because the switch logs the switch ports connected to the server(s) and client device(s), and thereby 'knows' the relative locations of client device and server, the switch may send address allocation communications between LAN server(s) and client device(s) as unicast communications directed to the server(s) and client device(s), thereby minimizing broadcast communications for address allocation in a LAN.

Simply put, to minimize broadcast communication in a network for client device address allocation, LAN switches log relative server and client device locations in a LAN based on initial broadcast communications or a set of broadcast communications by monitoring the broadcast communications and contents thereof, and then instead of subsequently broadcasting messages between servers and client devices, the switches may implement unicast communications to relevant servers and client device(s) based on the log at the switch of server and client device locations in a LAN relative to the switch.

FIG. 1 shows a network system 100 including a LAN 110. Network system 100 includes clients 102 and 104, LAN 110, and network 120. LAN 110 includes switches 112 and 114, router 116, and server 118. LAN 110 is coupled to network 120 via server 118. Client 102 is coupled to LAN 110 via switch 112 and client 104 is coupled to LAN 110 via switch 114. Internal to LAN 110, switches 112 and 114 are coupled to server 118 via router 116. LAN 110 illustrates one type of LAN network topology, and other topologies may be used. For example, LANs often have multiple servers, and different LAN device connections and different topologies. LAN 110 may use IP addressing, and in LAN 110, server 118 may use DHCP for allocating IP addresses.

Figure 2:
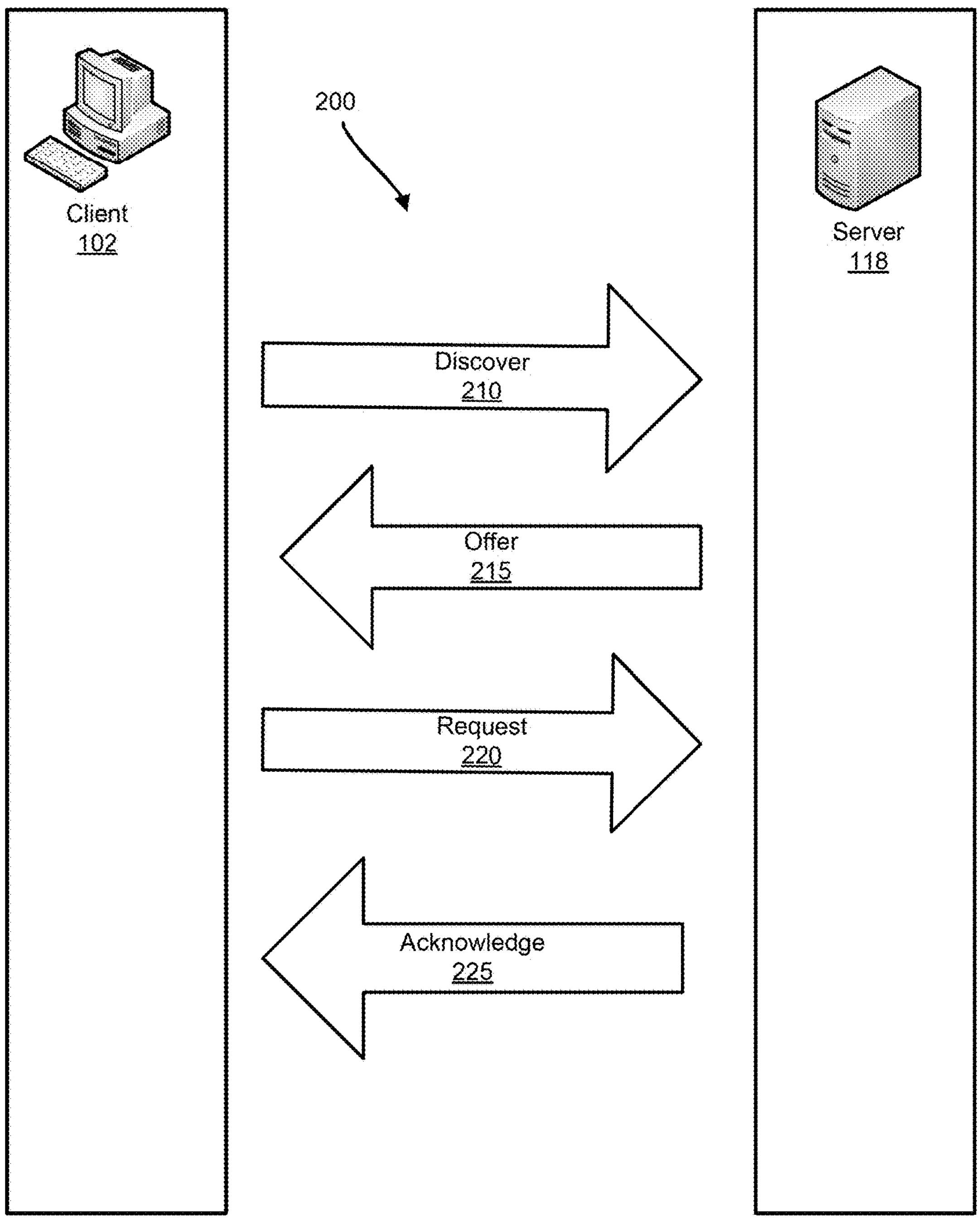
FIG. 2 is an example illustration of an embodiment of network communications.

FIG. 2 is a simplified illustration of IP address allocation communications 200 between a client device and a server using DHCP in a LAN. This simplified illustration omits illustration of intermediate switch device connections between client device and server. For example, these communications can be between client 102 and server 118 of LAN 110 of FIG. 1, allowing server 118 to allocate an IP address for client 102 in LAN 110. Client 102 may be added to a LAN including server 118. For example, client 102 may be booted up or coupled to the LAN, and thus not have an allocated IP address. To rectify this, client 102 broadcasts a discover communication 210, for example as a packet, which may be a DHCP command, over the LAN. Server 118 receives a broadcast discover communication and responds by broadcasting offer communication 215, for example as a packet, which may be a DHCP command, over the LAN. Offer communication 215 includes an IP address available for allocation to client 112, and may thus be considered as 'offering' the enumerated IP address in the offer communication.

As shown in IP address allocation communications 200, in response to receiving an offer communication 215, client 102 may request the offered IP address in offer communication 215 be allocated to itself for communication over the LAN. To this end, client 102 broadcasts a request communication 220 over the LAN. Request communication 220 requests the IP address assigning server assign the offered IP address to client 102. In response to receiving a request communication 220, server 118 may allocate the offered (by server 118) and requested (by client 102) IP address to client 102. Subsequent to allocating the requested IP address to client 102, server 118 broadcasts acknowledgement communication 225 over the LAN. An acknowledgement communication 225 is received by client 102, confirming to client 102 that client 102 has been allocated the requested IP address on the LAN.

In embodiments, a switch is located in the LAN between the server and client. One switch port may be communicatively coupled to the server, and another switch port may be be communicatively coupled to the client device. A switch may log the port associated with the server and log the port associated with the client based on communications such as those shown in FIG. 2. Thus, based on a set of broadcast communications between a client and a server in a LAN, switches in the LAN may learn addresses and ports associated with clients and servers, so as to be able to send unicast communications instead of broadcast communications. For example, subsequent to the IP address allocation communications shown at 200 of FIG. 2, a switch that has logged server and client routing information by monitoring communications 210-225, will know the relative location in the LAN of the server, and will be able to send unicast messages to the server from LAN client devices instead of a broadcast through the LAN, thus reducing LAN traffic. Similarly, by monitoring broadcasts and responses thereto, the switch will be able to route broadcast communications from the server as unicast communications directed to individual client devices connected to the LAN.

Figure 3:
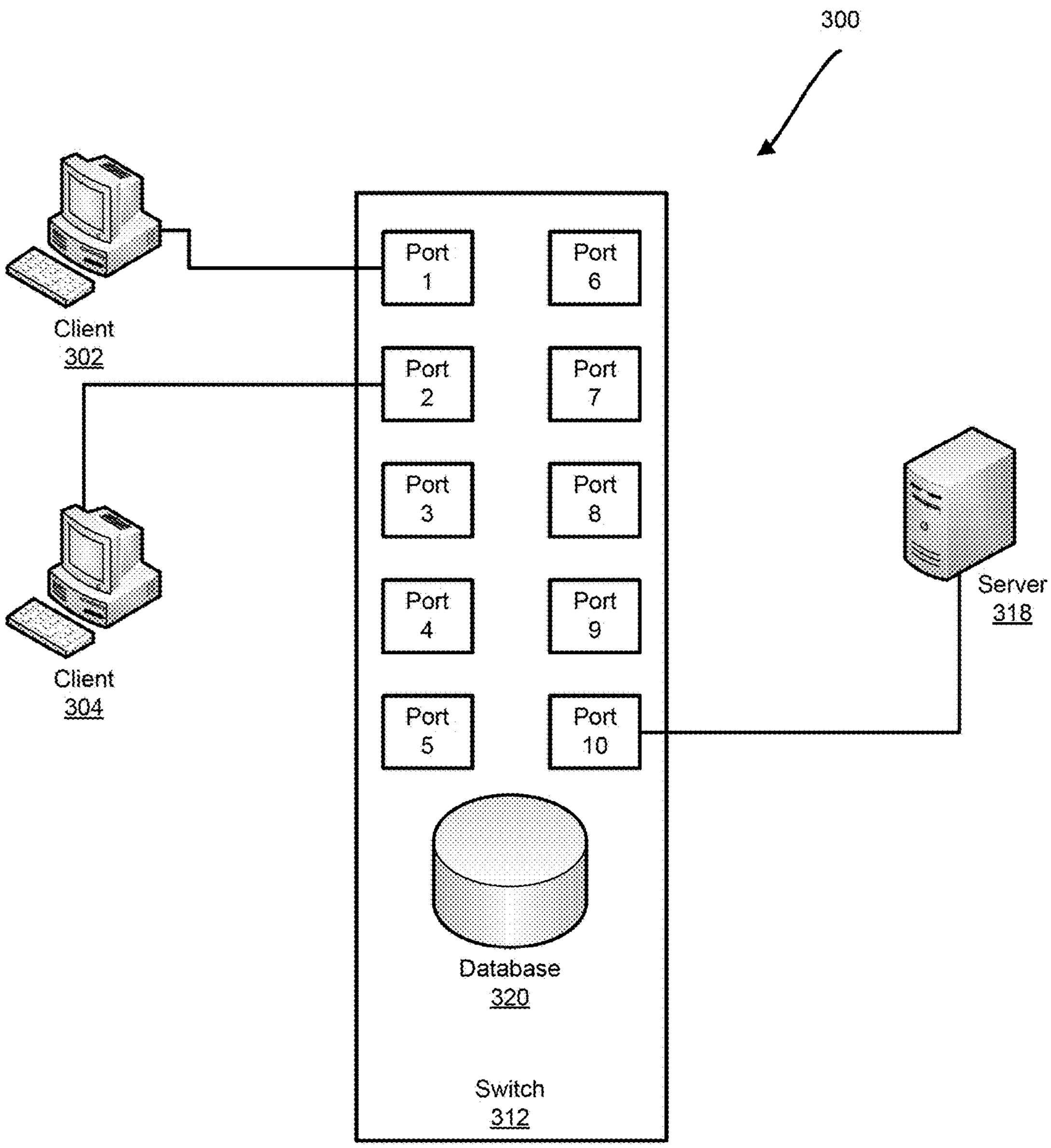
FIG. 3 is an example embodiment of a Local Area Network.

FIG. 3 shows an embodiment of a LAN system 300. LAN system 300 includes clients 302 and 304, switch 312, and server 318. Switch 312 has ports 1-10 which may be coupled to LAN devices. As shown, client 302 is connected to port 1 of switch 312, and client 304 is connected to port 2 of switch 312. Server 318 is connected to port 10 of switch 312. Switch 312 is configured to switch packets or other communications between ports 1-10 to facilitate communications in LAN system 300. Switch 312 further comprises database (or other data storage) 320 which may store data such as port information. Switch 312 may log or record data from monitored communications in a table in database 320. In one embodiment, database 320 stores a Content Addressable Memory (CAM) table which may correlate media access control (MAC) addresses in a LAN with switch ports of a switch, such as switch ports 1-10 of switch 312.

In embodiments, the entries of the switch CAM table may be expanded to include IP addresses and DHCP data. In operation, when switch 312 is switching packets between ports, switch 312 may monitor the IP addresses assigned a device and may monitor the port associated with a device, and record the ports and IP addresses in the CAM table. Once the switch CAM table is populated with entries correlating switch ports and IP addresses, or substantially populated, the CAM table entries and correlations may be used by the switch to avoid broadcast DHCP communications when allocating IP addresses in the LAN.

FIG. **4*a* is a more detailed illustration of IP address allocation communications 400*a* between client devices and a server involving an intermediate switch using DHCP in a LAN. In 400*a*, client device 402 may be configured to communicate with server 408 via switch 406 over LAN 409. Switch 406 may have multiple ports, one of the ports may be connected to server 408 over LAN 409, and one of the ports may be connected to client 402 over LAN 409. Switch 406 may include database 407** or other data storage which may be used for storing routing data or other data, such as a CAM table.

If client 402 is not allocated an IP address for communication over LAN 409 (for example, if client 402 is recently powered up or coupled to LAN 409), client 402 may broadcast a discover communication 410 into LAN 409. The purpose of discover communication 410 is to begin the process of IP address allocation for client device 402 in a LAN per the DHCP protocol. Discover communication 410 is received at switch 406 in LAN 409 and switch 406 broadcasts discover communication 410 in LAN 409, and a broadcast communication 410 is received at server 408. In response, server 408 broadcasts offer communication 415 in LAN 409, which is received by switch 406. Offer communication 415 includes an unallocated IP address for LAN 409 which may be allocated to client 402. In turn, switch 406 broadcasts offer communication 415 in LAN 409, and a broadcast communication 415 is received at client 402.

As shown in **400*a*, client 402 may request that the offered IP address be allocated to itself. Client 402 broadcasts request communication 420 into LAN 409, and broadcast request communication 420 is received by switch 406. In turn, switch 406 broadcasts request communication 420 into LAN 409, and a broadcast request communication 420 is received at server 408. Server 408 may allocate the requested IP address in request communication 420 to client 402, for example, by maintaining a database of allocated IP addresses, and correlating the requested IP address with client 402 in the database, for example, in a database entry. Server 408 may confirm the IP address allocation to client 402 by broadcasting acknowledge communication 425 into network 409. Switch 406 receives acknowledge communication 425 over LAN 409 and broadcasts acknowledge communication 425 over LAN 409. Client 402 receives an acknowledge communication 425, and is thus confirmed that the requested IP address is allocated as an IP address for itself in LAN 409**.

Figure 4A:
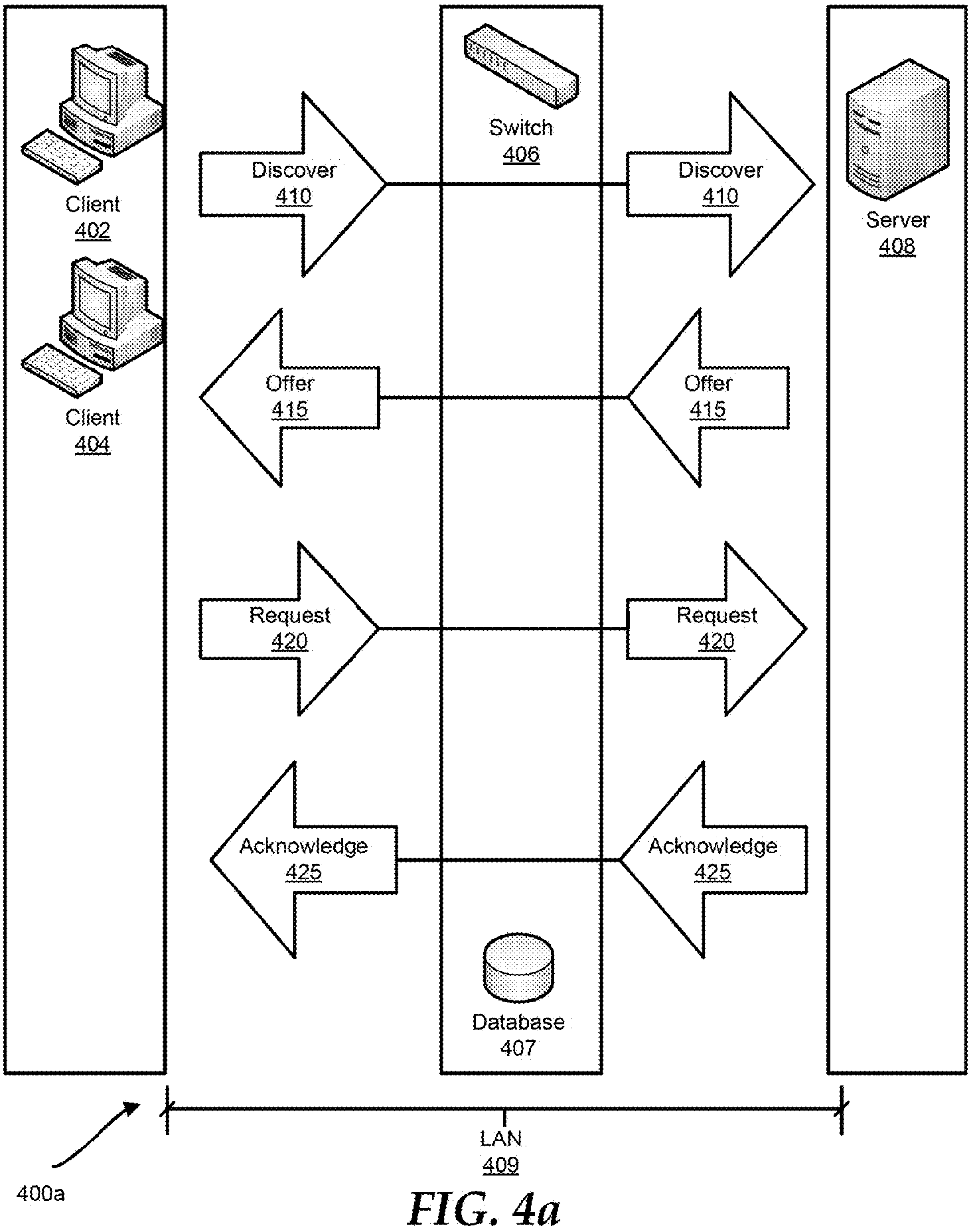
FIGS. 4*a* and 4*b* are example illustrations of embodiments of network communications.

As can be seen from the above discussion of FIG. 4*a*, broadcast communication to allocate IP addresses to a client device in LAN 409 clogs the bandwidth of LAN 409 with broadcast communications. To minimize broadcast communications for IP address allocations in LAN 409, switch 406 may monitor communications between server 408 and LAN client devices and correlate IP addresses (or other addresses) derived from the communications with switch ports of the switch. In short, switch 406 may be modified and configured to log addresses and ports, and then send unicast communications out individual ports to LAN servers and client devices instead of broadcast communications using the log. For example, the CAM table of a switch may be expanded with IP addresses so that the ports of switch 406 are correlated with MAC addresses and allocated IP addresses. This CAM table may be stored in database 407. An example of a CAM table with extended entries for switch port, MAC address, and IP address, is shown below (as Table 1):

TABLE 1

| Switch 406 CAM Table | | | | |
|---|---|---|---|---|
| VLAN | Port | MAC Address | IP Address | DHCP |

Multiple aspects may be used to limit broadcasting on a network as part of network, for example, IP, address allocation. For example, a switch may log a MAC address (or more generally, an address) of a client device when the switch receives a discover request from the client with the corresponding port of the switch the discover request is received on. The MAC address of the client may be stored in a CAM table such as illustrated above to correlate the switch port connected to the client with the MAC address of the client. For example, if a switch receives a discover request on port 1 from a client device, the switch will save the MAC address derived from the discover request with port 1 in its CAM table. Subsequently, offer and acknowledge broadcasts received at the switch from a server may be unicast sent out of the switch port corresponding to the MAC address specified in the offer and acknowledge broadcasts received at the switch.

Similarly, when a switch receives an offer broadcast from a server in response to a discover request from a client device, the switch will identify the offer broadcast as an offer broadcast by monitoring packet data. The switch will log the MAC and IP (or other) addresses of the server in its CAM table, for example, together with the switch port the offer is received on, thereby correlating the switch port in communication with the server with the IP and MAC addresses of the server. Subsequently, discover and request broadcasts received at the switch from a client device may be unicast sent to the server by transmission out of the switch port corresponding to the server.

Still further, with regard to minimizing broadcasting offer and acknowledge communications on a LAN sent from a server, the switch may monitor for broadcast offer and acknowledge communications from a server. When detected by the switch, the offer or acknowledge communications may be assessed for the client device MAC address in the client hardware address field of the packets: this client device MAC address is compared with existing MAC addresses which may have been logged and stored in the switch CAM table or other storage. If a corresponding MAC address is located in the switch CAM table or other storage, the offer and acknowledge communications will be routed out of the switch port corresponding to the MAC address, thereby effecting unicast transmission of broadcast offer and acknowledge communications to the client device.

Thus, if switch 406 is modified and configured to monitor communications between server 408 and LAN client devices and correlate addresses derived from the communications with switch ports of the switch, and an initial address allocation procedure is performed with broadcast discover, offer, request and acknowledge communications, switch 406 will have a table correlating ports with server 408 and client 402. This log of ports and corresponding IP addresses may be leveraged to perform unicast communications when subsequently performing IP address allocations for other client devices added to LAN 409. For example, if client 404 is added to LAN 409 subsequent to the IP address allocation procedure performed for client 402 and discussed above, switch 406 will have a table correlating one of its ports with server 408.

Figure 4B:
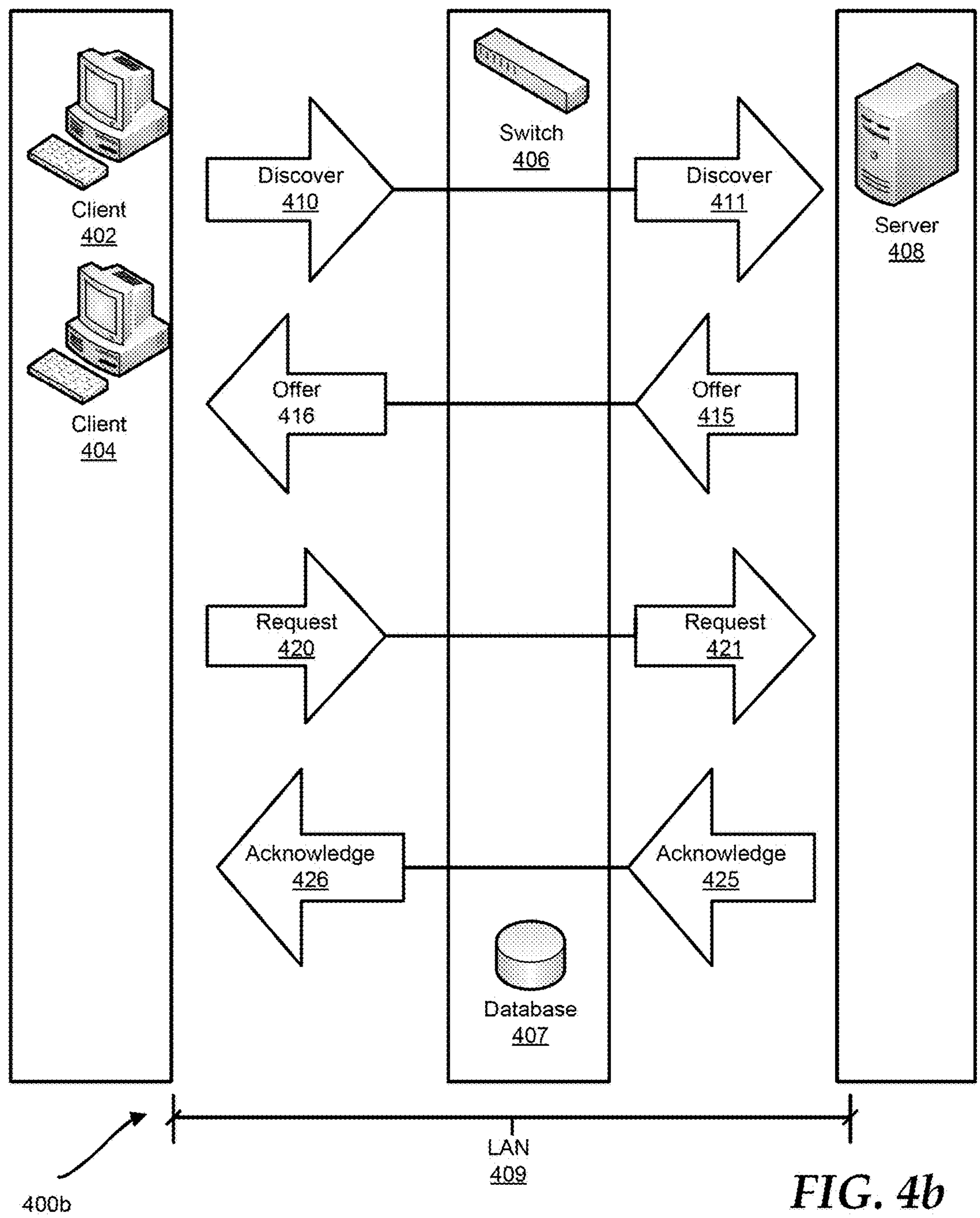

FIG. 4*b* illustrates leveraging a log of ports and corresponding addresses, which may be developed or compiled by monitoring the communications of 400*a*, to avoid broadcast communications in LAN 409 for IP address allocation communications. The following discussion of communications 400*b* presumes preceding communications 400*a* and a log or other storage correlating a switch port of switch 406 with server 408 is accessible by switch 406. Data storage IP address allocation communications 400*b* between client devices and a server involving an intermediate switch using DHCP in a LAN may use unicast communications. Client device 404 may be turned on or added to LAN 409 and as such may not have an allocated IP address for LAN 409, and may therefore perform address allocation procedures with LAN 409.

To obtain an IP address for LAN 409, client device 404 broadcasts discover communication 410 on LAN 409 which is received at switch 406. Switch 406 in turn may log the port which received discover communication 410 and correlate that port with client 404. Switch 406 refers to its log of LAN servers and its corresponding ports, and sends a unicast communication to servers. Specifically, in 400*a*, switch 406 logged the port associated with server 408 in database 407. As shown, switch 406 sends discover communication 411 to server 408 as a directed unicast communication out of its port in communication with server 408. Thus, in embodiments, a broadcast communication of discover communications being sent out of multiple (or all) ports of switch 406 is avoided, thereby conserving LAN bandwidth.

Server 408 receives the unicast directed discover communication 411, and responds with offer communication 415 which is broadcast on LAN 409 and received at switch 406. As discussed above, switch 406 used discover 410 to log the port associated with client 404. Thus, instead of broadcasting offer communication 416 over LAN 409, switch 406 sends a directed unicast offer communication 416 directed to client 404 over LAN 409 using the specific port in communication with client 404. Thus, client 404 receives an IP address allocation offer using directed unicast communications 411 and 416, thereby avoiding broadcast communications between switch 306 and server 408 and between switch 406 and client 404.

In embodiments, switch 406 correlates the MAC address of client 404 with the port associated with client 404 in a CAM table. When offer communication 415 is received at switch 406, switch 406 assesses offer communication 415 for the MAC address of client 404. The MAC address is then used to determine the port to transmit offer communication 416 from switch 406.

In response to receiving IP address allocation offer 416, client 404 may request the offered IP address be allocated to itself. To this end, client 404 may broadcast request communication 420 over LAN 409. In LAN 409, switch 406 receives the broadcast request communication 420. Because switch 406 knows the IP address of server 408 in LAN 409 due to maintaining a log with entries correlating its ports with IP addresses and server 408, in response to receiving broadcast request communication 420, switch 406 sends directed unicast request communication 421 to server 408. In response to receiving request communication 421, server 408 broadcasts acknowledge communication 425 into LAN 409. Acknowledge communication 425 is received at switch 406 in LAN 409. Because switch 406 knows the port associated with client 404 due to maintaining a log with entries correlating its ports with MAC addresses and client devices, in response to receiving broadcast acknowledge communication 425, switch 406 sends directed unicast acknowledge communication 426 to client 404.

More particularly, in embodiments, when acknowledge communication 425 is received at switch 406, switch 406 assesses acknowledge communication 425 for the MAC address of client 404. The MAC address is then used to determine the port to transmit acknowledge communication 426 from switch 406.

In various embodiments, discover, offer, request, and acknowledge communications are in the form of a packet. For example, a DHCP packet transmitted as discussed above may have an ethernet portion, an IP portion and DHCP portion. The ethernet portion may include the source MAC address and the destination MAC address. The IP portion may include the source and destination IP addresses for a LAN. And the DHCP portion may include an indication of whether the packet is a DHCP discover, offer, request, or acknowledge communication. An example table indicating packet data is shown below (as Table 2):

TABLE 2

| | | |
|---|---|---|
| Ethernet portion | Source MAC Address | Destination MAC Address |
| IP portion | Source IP Address | Destination IP Address |
| DHCP portion | Message Type | |

Figure 5A:
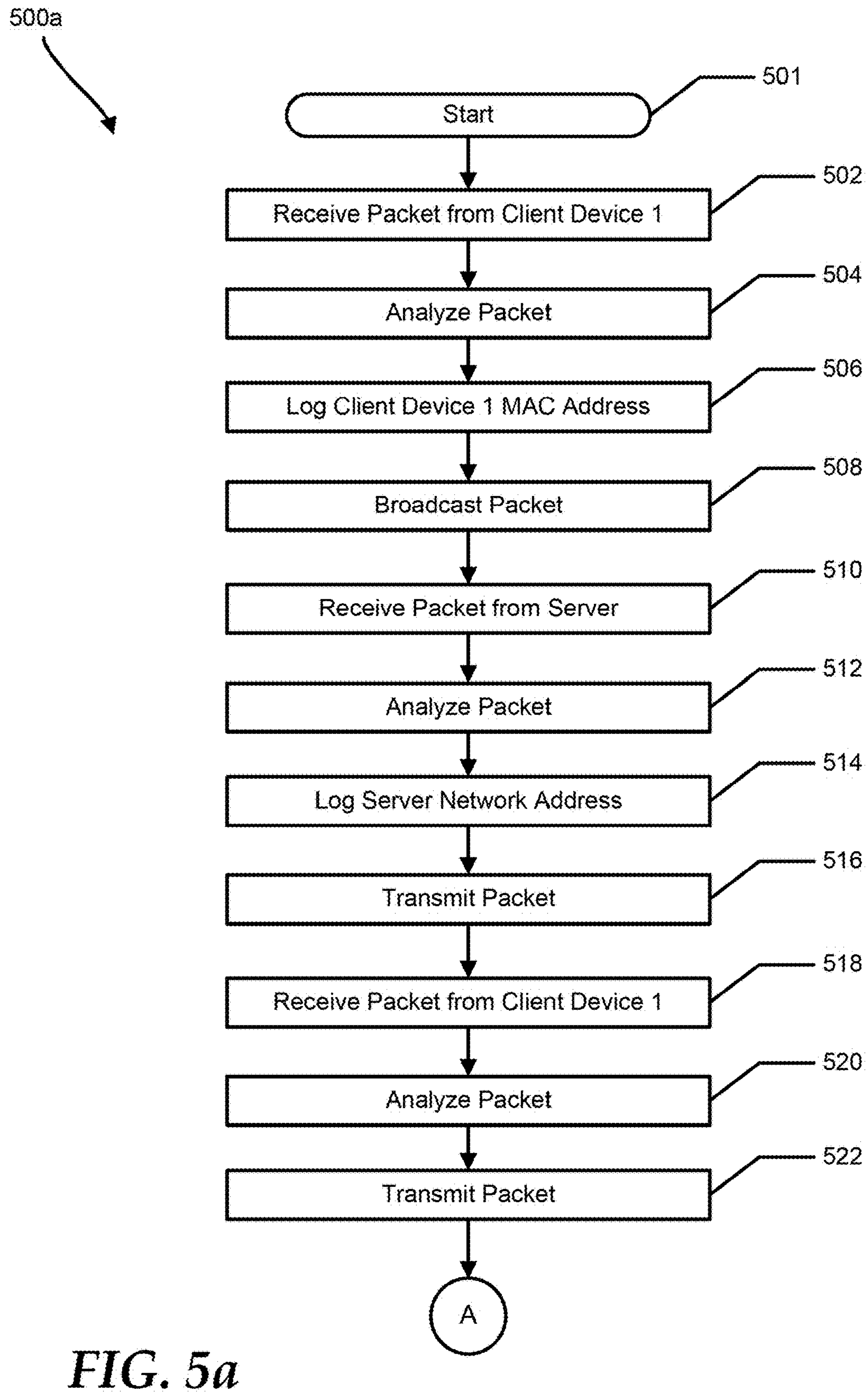
FIGS. 5*a*, 5*b*, and 5*c* are flowcharts of embodiments for allocating network addresses over a network.
Figure 5B:
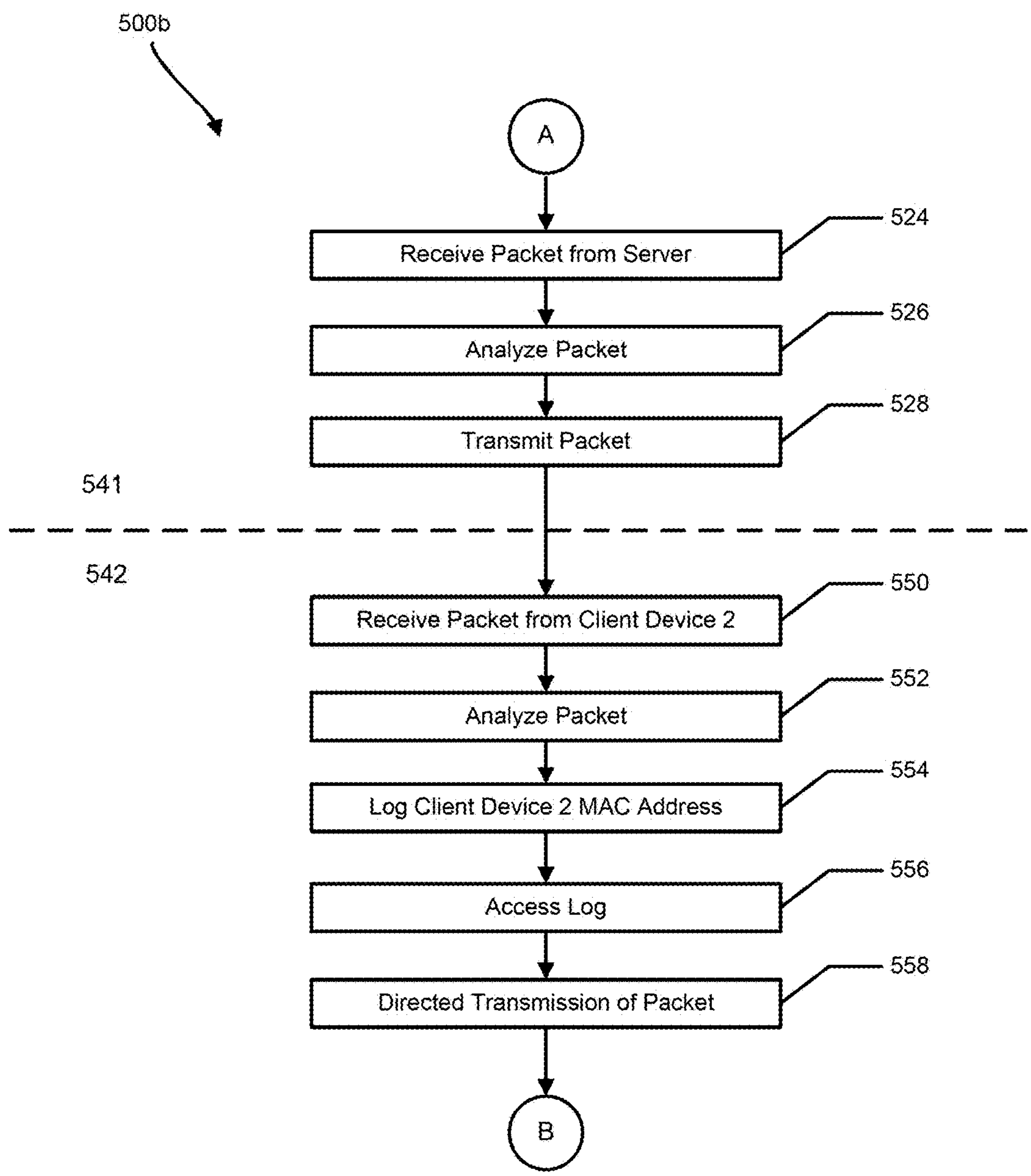
Figure 5C:
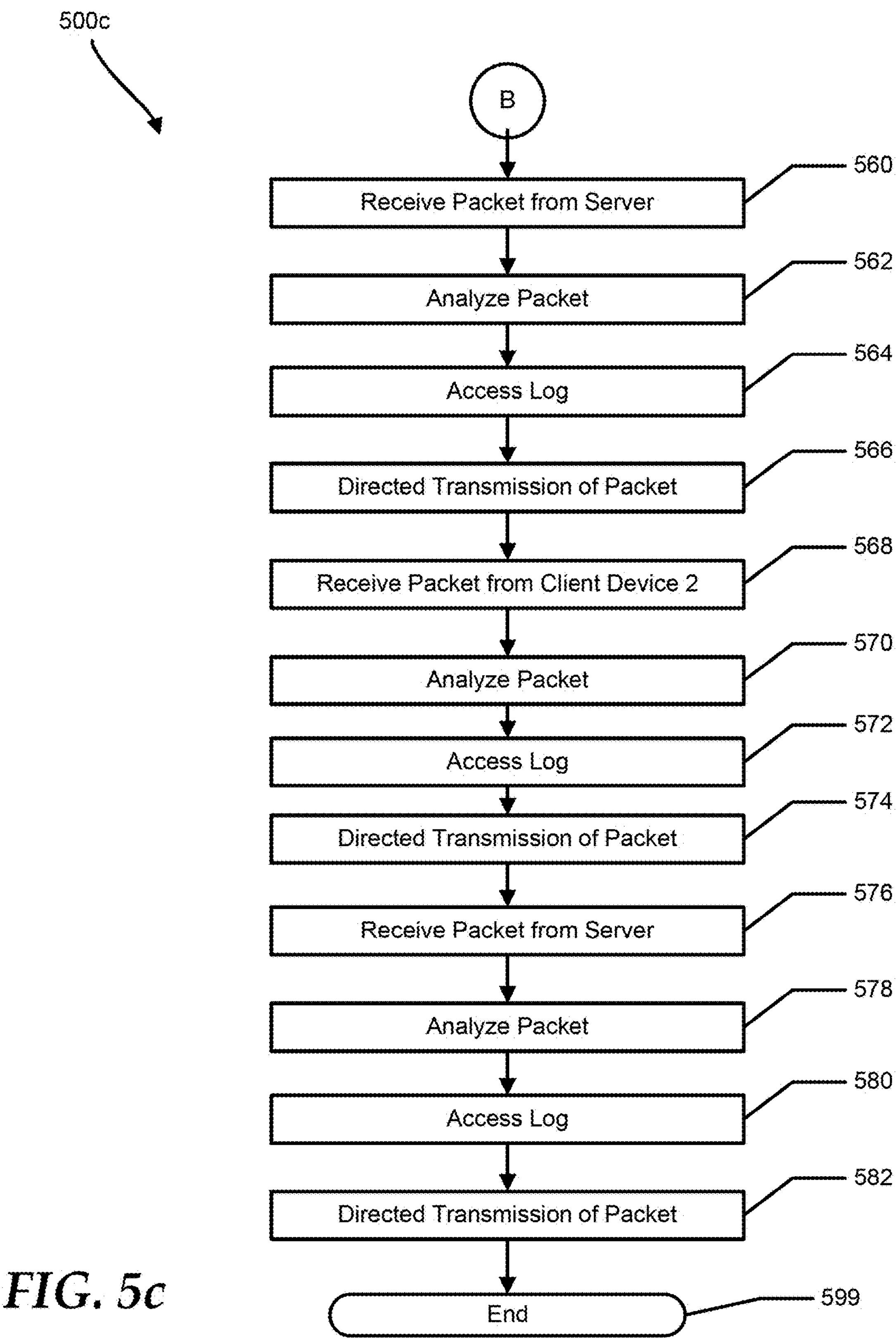

FIG. 5 is an example flowchart 500 of processes and procedures performed at a switch according to various embodiments. More particularly, flowchart 500 illustrates a procedure allowing for unicast transmission of IP allocation communications in a LAN. The flowchart of FIG. 5 is premised on a single server in a LAN.

At 501, the process begins at a switch in a LAN, and at 502 the switch receives a packet from a client device 1. The packet may be analyzed at the switch to determine what type of packet the packet is at 504. The switch determines the packet is a discover packet broadcast from client device 1 requesting assignment of an IP address for the LAN supported by the switch. At 506, the switch logs the client device 1 MAC address in a CAM table in an entry correlating the switch port coupled to the client device 1 with the client device 1. The MAC address may be obtained from the ethernet portion of the packet received at 502. At 508, the switch broadcasts the received discover packet into the LAN.

At 510, the switch receives a packet from a LAN server, and at 512, analyzes the packet. The packet may be analyzed to determine if it is a DHCP offer packet by analyzing the DHCP portion of the packet. Packet analysis may involve determining a MAC address of client device 1 located in the ethernet portion of the packet. Packet analysis may involve determining a IP network address of the server located in the IP portion of the packet. Then, at 514, the IP network address of the server is logged in the CAM table of the switch in an entry correlating the port the packet was received on with the IP network address of the server. At 516 the packet is transmitted onto the LAN by the switch. The packet may be broadcast, or, if the packet had a MAC address corresponding to client device 1, the switch may look up the MAC address in the CAM table and direct unicast transmit the packet to client device 1.

At 518, the switch receives a packet from client device 1. At 520, the switch analyzes the packet to determine if the packet is a DHCP request packet by analyzing the DHCP portion of the packet. At 522, the switch transmits the packet onto the LAN. The packet may be broadcast, or, in some embodiments, the switch may use the CAM table to direct unicast the packet to the server by sending the packet out of the port corresponding to the IP address of the server in the CAM table.

At 524, the switch receives a packet from the server, and at 526 analyzes the packet. For example, the switch may analyze the DHCP portion of the packet to determine if the packet is an acknowledgement packet. The switch may also analyze the packet to determine if there is a MAC address associated with client device 1. The switch then transmits the packet, at 528. The packet may be broadcast, or, if the packet had a MAC address corresponding to client device 1, the switch may look up the MAC address in the CAM table and direct unicast transmit the packet to client device.

502 to 528 are drawn to an initial address allocation 541 in the LAN in which the network address of the server is correlated with a port of the switch. 550 to 582 are drawn to a subsequent address allocation 542 in which the relative network location of the server is used for directed unicast address allocation communications. (541 and 542 illustrated by the dashed line in FIG. 5*b*)

Subsequently, at 550, the switch receives a packet from a client device 2. A packet embodiment may include the following parameters (as shown in Table 3):

TABLE 3

| | | |
|---|---|---|
| Ethernet portion | Source MAC Address: client device 2 MAC address | Destination MAC Address: unspecified |
| IP portion | Source IP Address: unspecified | Destination IP Address: broadcast command |
| DHCP portion | Message Type: discover | |

The packet may be analyzed at the switch to determine what type of packet the packet is at 552. The switch determines the packet is a discover packet broadcast from client device 2 requesting assignment of an IP address for the LAN supported by the switch by analyzing the DHCP portion of the packet. At 554, the switch logs the client device 2 MAC address in the CAM table in an entry correlating the switch port coupled to the client device 2 with the client device 2. The MAC address may be obtained from the ethernet portion of the packet received at 550.

The switch further accesses its CAM table, at 556, to determine an IP address and corresponding switch port of the server and then, at 558, direct unicast transmits the packet to the server out of the associated switch port, thereby avoiding broadcast transmission for the packet. The modified packet may include the following parameters (as shown in Table 4):

TABLE 4

| | | |
|---|---|---|
| Ethernet portion | Source MAC Address: client device 2 MAC address | Destination MAC Address: server MAC address |
| IP portion | Source IP Address: unspecified | Destination IP Address: server IP address |
| DHCP portion | Message Type: discover | |

At 560, the switch receives a packet from the server, and at 562, analyzes the packet. The packet may be analyzed to determine if it is a DHCP offer packet by analyzing the DHCP portion of the packet. Packet analysis may involve determining a MAC address of client device 2 located in the ethernet portion of the packet. The packet may include the following parameters (as shown in Table 5):

TABLE 5

| | | |
|---|---|---|
| Ethernet portion | Source MAC Address: client server MAC address | Destination MAC Address: unspecified |
| IP portion | Source IP Address: server IP address | Destination IP Address: broadcast command |
| DHCP portion | Message Type: offer | |

Then, at 564, the CAM table of the server is accessed to look up the MAC address of client device 2 in the CAM table and direct unicast transmit the packet to client device 2 using the MAC address. This may be effected by modifying the packet with the MAC address of client device 2 and transmitting the packet out of the switch port associated with (for example in communication with) client device 2. The switch modified packet may include the following parameters (as shown in Table 6):

TABLE 6

| | | |
|---|---|---|
| Ethernet portion | Source MAC Address: server MAC address | Destination MAC Address: client device 2 MAC address |
| IP portion | Source IP Address: server IP address | Destination IP Address: unspecified |
| DHCP portion | Message Type: offer | |

At 568, the switch receives a packet from client device 2, and, at 570, analyzes the packet. The packet may include the following parameters (as shown in Table 7):

TABLE 7

| | | |
|---|---|---|
| Ethernet portion | Source MAC Address: client device 2 MAC address | Destination MAC Address: unspecified |
| IP portion | Source IP Address: unspecified | Destination IP Address: broadcast command |
| DHCP portion | Message Type: request | |

The switch determines the packet is a request packet broadcast by analyzing the DHCP portion of the packet. The switch accesses its CAM table, at 572, to determine the IP address and corresponding switch port of the server and then, at 574, direct unicast transmits the packet to the server out of the associated switch port, thereby avoiding broadcast transmission for the packet. The modified packet may include the following parameters (as shown in Table 8):

TABLE 8

| | | |
|---|---|---|
| Ethernet portion | Source MAC Address: client device 2 MAC address | Destination MAC Address: unspecified |
| IP portion | Source IP Address: unspecified | Destination IP Address: server IP address |
| DHCP portion | Message Type: request | |

At 576, the switch receives a packet from the server, and at 578, analyzes the packet. The packet may be analyzed to determine if it is a DHCP acknowledge packet by analyzing the DHCP portion of the packet. Packet analysis may involve determining a MAC address of client device 2 located in the ethernet portion of the packet. The packet may include the following parameters (as shown in Table 9):

TABLE 9

| | | |
|---|---|---|
| Ethernet portion | Source MAC Address: server MAC address | Destination MAC Address: client device 2 MAC address |
| IP portion | Source IP Address: server IP address | Destination IP Address: broadcast command |
| DHCP portion | Message Type: acknowledge | |

Then, at 580, the CAM table of the switch is accessed to look up the MAC address of client device 2 in the CAM table and, at 582, is the packet is direct unicast transmitted to client device 2 using the MAC address. This may be effected by transmitting the packet out of the switch port associated with (for example in communication with) client device 2. The switch modified packet may include the following parameters (as shown in Table 10):

TABLE 10

| | | |
|---|---|---|
| Ethernet portion | Source MAC Address: server MAC address | Destination MAC Address: client device 2 MAC address |
| IP portion | Source IP Address: server IP address | Destination IP Address: unspecified |
| DHCP portion | Message Type: offer | |

At 599, both client device 1 and client device 2 have been allocated IP addresses, and the process ends. As described above, broadcast transmissions in the LAN for IP address allocation in a LAN may be partially avoided with regard to the initial IP address allocation with regard to client device 1, and completely avoided with to the subsequent IP address allocation with regard to client device 2.

While the above has been discussed with regard to a single switch and server in a LAN, the concepts discussed above may be extended to multiple servers and switches in a LAN. IP address allocation tables may be maintained for the servers, and each of the switches may have extended CAM tables to store IP and MAC addresses as discussed above.

Figure 6:
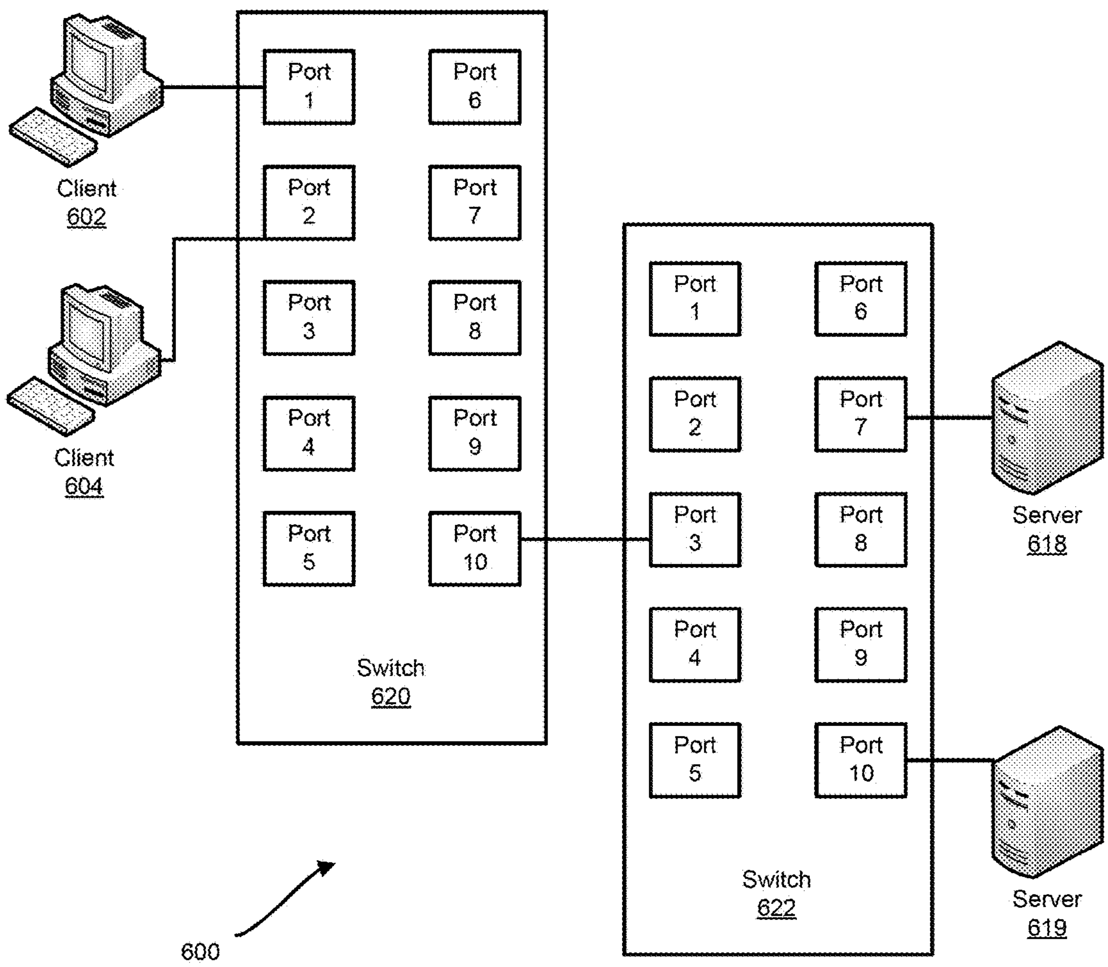
FIG. 6 is an example embodiment of a Local Area Network.

FIG. 6 is example illustration of an embodiment of a LAN system 600. LAN system 600 has more LAN devices than LAN system 300 of FIG. 3, including more than one switch and server. LAN system 600 includes clients 602 and 604, switches 620 and 622, and servers 618 and 619. Switches 620 and 622 each have ports 1-10 which may be coupled to LAN devices. As shown, client 602 is coupled to port 1 of switch 620 and client 604 is coupled to port 2 of switch 620. Port 10 of switch 620 is coupled to port 3 of switch 622. Port 7 of switch 622 is coupled to server 618 and port 10 of switch 622 is coupled to server 619. Each of switches 620 and 622 may be configured to have an extended CAM table as discussed above. Once populated, the extended CAM tables may be used to avoid broadcasting IP address allocation messages, as discussed above, by unicast transmission of packets between clients and servers 618 and 619.

In embodiments with more than one server in a LAN, such as illustrated in FIG. 6, the switch may forward the discover communication to all servers in the LAN. Similarly, if there is more than one server in the LAN, the switch may forward the request communication to all servers. When a further or new server is added to a LAN, the switch tables discussed above correlating addresses with switch ports may be cleared because the compiled tables at the switches may no longer be valid given the new LAN topology. In further embodiments, each switch may associate a timer and time-out time with its table, and the table may be wiped clean after the time-out time. Furthermore, when an administrator adds a further server to a LAN, the administrator may clear the tables correlating ports to servers at the switches. For example, the administrator may send a clear command clearing the tables to the switches. Subsequent to clearing the tables, the tables may be repopulated with the techniques discussed above to avoid broadcast communications in IP address allocation in the LAN.

Figure 7:
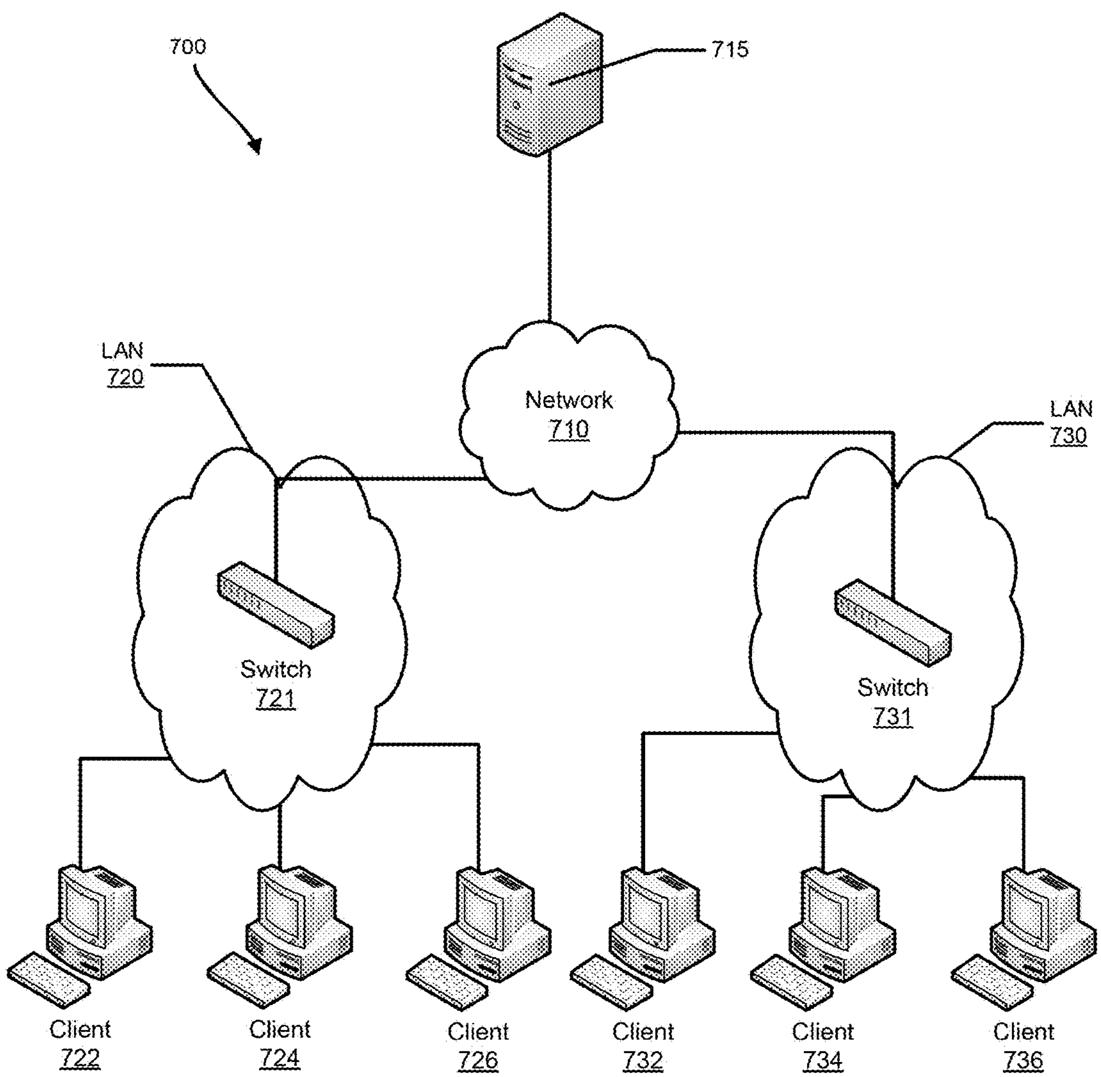
FIG. 7 is an example embodiment of a network.

Embodiments of the above can be extended to relay agents in the context of multiple LANs connected by a network. More particularly, above embodiments can be extended to avoid broadcasting into LANs in a DHCP relay system with two or more LANs. FIG. 7 illustrates relay system 700. System 700 includes network 710, LAN 720, LAN 730 and server 715. LAN 720 in turn comprises switch 721, and client devices 722, 724, and 726. LAN 730 in turn comprises switch 731, and client devices 732, 734, and 736.

More particularly, network 710 is coupled to server 715, and LAN 720 and 730 via switches 721 and 731, respectively. Switch 721 is in communication with client devices 722, 724, and 726. Switch 731 is in communication with client devices 732, 734, and 736. According to prior art methodologies, the switches would broadcast network address allocation communications into LAN 720 and 730. Switches 721 and 731 may analyze network address allocation communications and determine the server network address of server 715, similar to the methodologies of embodiments described herein. Subsequent to determining the server network address of server 715, switches 721 and 731 may direct unicast network address allocation communications from client devices to server 715. Switches 721 and 731 may analyze network address allocation communications and determine the MAC addresses of client devices, similar to the methodologies of embodiments described herein. Subsequent to determining the MAC addresses of client devices and correlating the MAC addresses with switch ports, switches 721 and 731 may direct unicast network address allocation communications from server 715 to client devices.

Embodiments described herein may be used in conjunction with DHCP snooping. In DHCP snooping, messages from an untrusted server or other network devices may be dropped. For example, a switch port of a switch may be associated with an untrusted network device, and the switch may drop communications received over this switch port. This switch may be modified as described above, and perform unicast transmission of network address allocation communications as discussed above, and may maintain an augmented CAM table as discussed above, allowing for direct unicast transmissions to client devices and one or more server(s).

Figure 8:
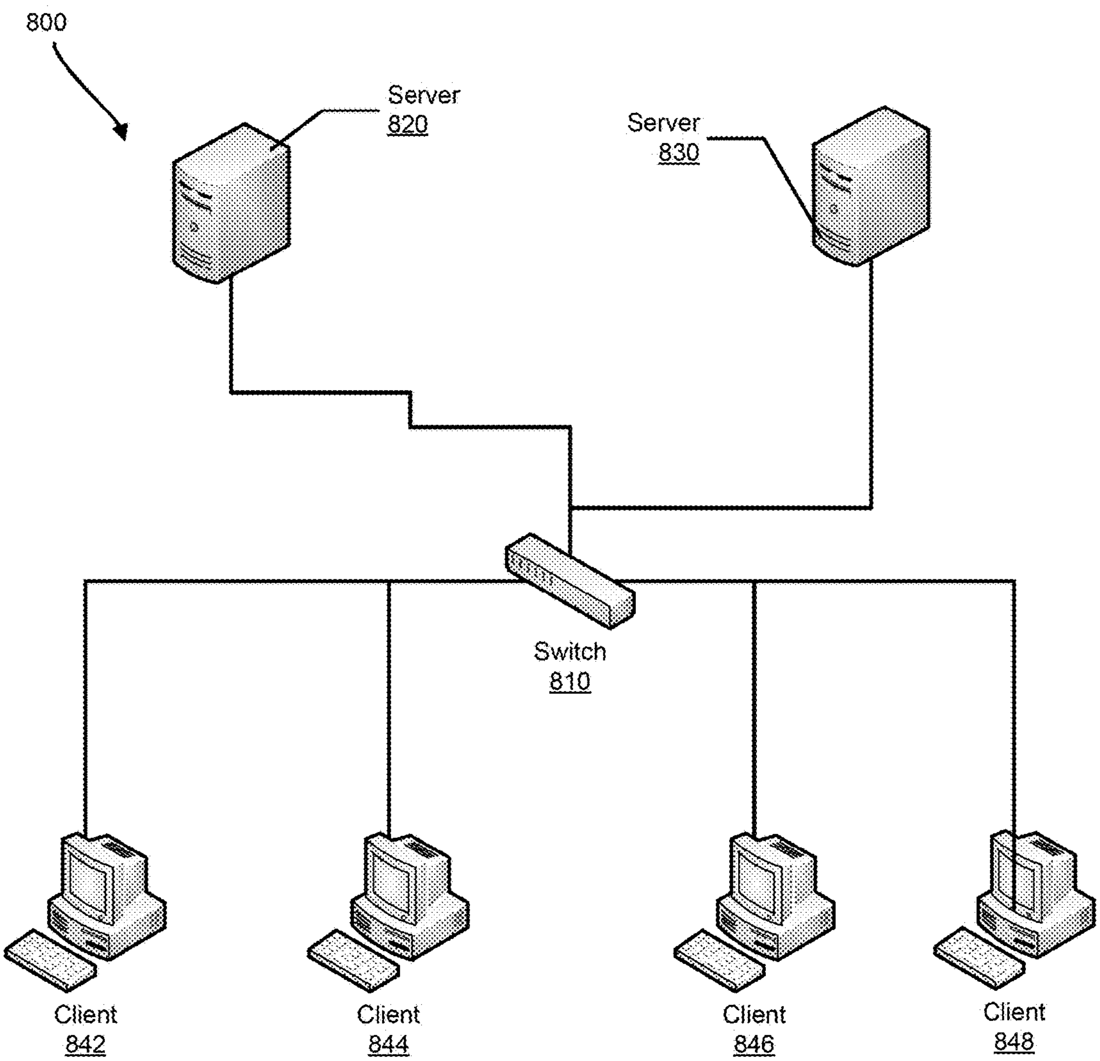
FIG. 8 is an example embodiment of a network.

FIG. 8 is an example illustration of a DHCP snooping system 800. System 800 comprises a switch 810, servers 820 and 830, and clients 842, 844, 846, and 848. Switch 810 is communicatively connected to servers 820 and 830. Switch 810 is also communicatively connected to client devices 842, 844, 846, and 848. Sever 830 is an untrusted server, and per DHCP snooping, switch 810 may drop communications received on a port connected to server 830. As can be seen from FIG. 8, the topology of system 800 is amendable to application of embodiments described above. For example, switch 810 may be configured to maintain an extended CAM table as discussed above, and may be configured to have the logging functionality as discussed above, so that switch 810 may implement directed unicast communications when forwarding network address allocation communications.

Embodiments may be used in networks with one or more DHCP servers to avoid unnecessary DHCP broadcast packets, thereby conserving network bandwidth and increasing switch performance. This allows for faster network switches, thereby having the benefit of reducing unwanted congestion at switches. As network demands expand with more complex networks and the number of DHCP clients in a network grow, DHCP traffic in a network increases, and it may be difficult for servers to allocate IP addresses in the network in a timely manner or within a guaranteed time frame; embodiments described herein mitigate this problem of IP allocation in a network by reducing DHCP traffic at the network switch level which in turn reduces network congestion, thereby helping insure timely allocation of ID addresses. Thus, embodiments help to achieve a powerful and easy way to create a robust network infrastructure with reduced processing of DHCP packets in the network. Embodiments avoid DHCP broadcasts with regard to IP address allocations, thereby limiting unwanted packet processing at individual client devices on the network, which is significant for client device operability as network processing time at the client device is reduced. Enabling DHCP snooping brings down switch performance, embodiments disclosed herein avoid public device or unknown hosts from spoofing the DHCP servers, but also provide faster switch performance, thereby reducing the instances where DHCP snooping may be required. And, as is apparent from the above discussions, embodiments allow for routing network address allocation communications to individual relevant circuits as directed unicast communications, thereby avoiding the replication of address allocation communications broadcast onto potentially thousands of access circuits.

Embodiments discussed above may be implemented in software or in an application specific integrated circuit.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a “device,” a “module,” or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:

receiving a first set of network address allocation communications at a network device of a network, the first set of network address allocation communications including a second set of network address allocation communications received from a first client device of the network and a third set of network address allocation communications received from a server device of the network, wherein the second and third sets of network address allocation communications are broadcast communications;

analyzing the third set of network address allocation communications to determine a relative location of the server device in the network;

receiving a fourth set of network address allocation communications at the network device, the fourth set of network address allocation communications including a fifth set of network address allocation communications received from a second client device of the network and a sixth set of network address allocation communications received from the server device, wherein the fifth and sixth sets of network address allocation communications are broadcast communications;

analyzing the fifth set of network address allocation communications to determine a relative location of the second client device in the network;

modifying the fifth set of network address allocation communications with a media access control (MAC) address and internet protocol (IP) address of the server and the sixth set of network address allocation communications with a MAC address of the second client device; and transmitting the fifth set of network address allocation communications to the server device as directed unicast communications and the sixth set of network address allocation communications to the second client device as directed unicast communications.

2. The method of claim 1, wherein the network device is a switch device comprising a set of ports.

3. The method of claim 2, wherein determining a relative location of the server device comprises correlating a server network address with a port of the set of ports the sever device is in communication with.

4. The method of claim 3, wherein the server network address is a network IP address.

5. The method of claim 1, wherein the network is a Local Area Network.

6. The method of claim 2, wherein determining a relative location of the second client device comprises correlating a second client address with a port of the set of ports the second client device is in communication with.

7. The method of claim 6, wherein the second client address is a MAC address.

8. An apparatus configured to:

receive a first set of network address allocation communications over a network, the first set of network address allocation communications including a second set of network address allocation communications received from a first client device of the network and a third set of network address allocation communications received from a server device of the network, wherein the second and third sets of network address allocation communications are broadcast communications;

analyze the third set of network address allocation communications to determine a relative location of the server device in the network;

receive a fourth set of network address allocation communications over the network, the fourth set of network address allocation communications including a fifth set of network address allocation communications received from a second client device of the network and a sixth set of network address allocation communications received from the server device, wherein the fifth and sixth sets of network address allocation communications are broadcast communications;

analyze the fifth set of network address allocation communications to determine a relative location of the second client device in the network;

modify the fifth set of network address allocation communications with a media access control (MAC) address and internet protocol (IP) address of the server and the sixth set of network address allocation communications with a MAC address of the second client device; and transmit the fifth set of network address allocation communications to the server device as directed unicast communications and the sixth set of network address allocation communications to the second client device as directed unicast communications.

9. The apparatus of claim 8, wherein the apparatus is a switch device located in the network, the switch device having a set of ports.

10. The apparatus of claim 9, wherein the switch device broadcasts the first set of network address allocation communications in the network.

11. The apparatus of claim 9, wherein determining a relative location of the server device comprises correlating a server network address with a port of the set of ports the sever device is in communication with.

12. The apparatus of claim 9, wherein determining a relative location of the second client device comprises correlating a second client address with a port of the set of ports the second client device is in communication with.

13. The apparatus of claim 9, wherein the switch device direct unicast transmits a communication of the third set of network address allocation communications in the network.

14. The apparatus of claim 8, wherein the network is a Local Area Network.

15. A non-transitory computer readable medium containing instructions, that when executed, cause a network device to:

receive a first set of network address allocation communications over a network, the first set of network address allocation communications including a second set of network address allocation communications received from a first client device of the network and a third set of network address allocation communications received from a server device of the network, wherein the second and third sets of network address allocation communications are broadcast communications;

analyze the third set of network address allocation communications to determine a relative location of the server device in the network;

receive a fourth set of network address allocation communications over the network, the fourth set of network address allocation communications including a fifth set of network address allocation communications received from a second client device of the network and a sixth set of network address allocation communications received from the server device, wherein the fifth and sixth sets of network address allocation communications are broadcast communications;

analyze the fifth set of network address allocation communications to determine a relative location of the second client device in the network;

modify the fifth set of network address allocation communications with a media access control (MAC) address and internet protocol (IP) address of the server and the sixth set of network address allocation communications with a MAC address of the second client device; AND transmit the fifth set of network address allocation communications to the server device as directed unicast communications and the sixth set of network address allocation communications to the second client device as directed unicast communications.

16. The non-transitory computer readable medium of claim 15, wherein the network is a LAN.

17. The non-transitory computer readable medium of claim 15, wherein determining a relative location of the server device comprises correlating a server network address with a port the sever device is in communication with.

18. The non-transitory computer readable medium of claim 15, wherein determining a relative location of the second client device comprises correlating a second client address with a port the second client device is in communication with.

19. The non-transitory computer readable medium of claim 18, wherein the second client address is a MAC address.

20. The non-transitory computer readable medium of claim 16, wherein the network device is a switch device supporting the LAN.

* * * * *